United States Patent
Boyd et al.

(10) Patent No.: US 7,275,502 B2
(45) Date of Patent: Oct. 2, 2007

(54) PORTABLE ANIMAL CONTAINMENT DEVICE

(75) Inventors: Randal D. Boyd, Knoxville, TN (US); Christopher E. Mainini, Knoxville, TN (US); E. Douglas Grindstaff, Knoxville, TN (US); William Wallace, Maryville, TN (US); Terry G. Carpenter, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 11/294,934

(22) Filed: Dec. 6, 2005

(65) Prior Publication Data

US 2007/0125312 A1 Jun. 7, 2007

(51) Int. Cl.
*A01K 15/04* (2006.01)
(52) U.S. Cl. .................. 119/721; 119/908; 340/573.3
(58) Field of Classification Search ............. 119/712, 119/718, 719, 720, 721, 759, 908, 421, 859, 119/28.5; 340/573.3
See application file for complete search history.

(56) References Cited

U.S. PATENT DOCUMENTS

| 3,989,008 | A | * | 11/1976 | Neumann | .................. 119/28.5 |
| 4,949,216 | A | | 8/1990 | Djukastein | |
| 6,415,742 | B1 | * | 7/2002 | Lee et al. | .................... 119/721 |
| 6,490,995 | B2 | * | 12/2002 | Greene, Jr. | .................. 119/496 |
| 6,948,452 | B2 | * | 9/2005 | Wolfgram | .................... 119/712 |
| 7,021,244 | B2 | | 4/2006 | Boyd | |
| 2004/0216694 | A1 | * | 11/2004 | Boyd | ......................... 119/721 |
| 2005/0040954 | A1 | * | 2/2005 | McNally | .................. 340/573.3 |

* cited by examiner

*Primary Examiner*—Rob Swiatek
(74) *Attorney, Agent, or Firm*—Pitts & Brittian, PC (57) ABSTRACT

A portable animal containment device for confining an animal to a defined area. The portable animal containment device includes a flat and a correction unit. The flat is adapted to be portable and defines the area within which an animal is confined. The flat has an associated presence detector for detecting whether the animal is occupying the flat. When the presence detector indicates that the animal is not occupying the flat, a signal is transmitted to the correction unit by way of wireless communication. The correction unit is carried by the animal and administers a stimulus to the animal when the correction unit receives the signal from the transmitter. Consequently, when the animal moves beyond the boundary defined by the flat, it receives a stimulus, which encourages the animal to remain in the flat.

18 Claims, 6 Drawing Sheets

PORTABLE ANIMAL CONTAINMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a device for confining an animal to a small defined area. More particularly, this invention pertains to a portable device for confining an animal to a small defined area without using tangible barriers.

2. Description of the Related Art

Pet owners are often faced with the task of confining their pet to a small designated area. Various circumstances necessitate animal containment to a small area such as when an animal owner leaves an animal unattended in a home while the pet owner goes to work or school. Additionally, containment prevents an animal from chewing or scratching the pet owner's property or from tracking dirt and filth through the pet owner's home. Pet owners not only want to confine their pet to a small defined area, but want to do so in a manner that is safe and pleasant for the pet and in a manner that is aesthetically pleasing. Additionally, pet owners want unhindered access to their pet during confinement to the extent that pet owners can feed, groom, or otherwise tend to their pet. Oftentimes, pet owners must confine their pet to a small designated area that is not within the pet owner's home. Circumstances such as these include the pet owner visiting family or a friend and bringing the pet along, or the pet owner leaving the pet with a friend and going out of town, or the pet owner taking the pet to a public place where the pet must be confined to a small area. Consequently, the pet owner requires an animal containment device that is portable.

Conventional devices that address the discussed issues of animal containment to a small designated area include pet crates. A pet crate is essentially a portable cage that is large enough to hold the pet. While a pet crate is portable and confines a pet to a small designated area, this type of conventional device is limited in that the confinement is not pleasant for the pet and is likely to be perceived by the pet as punishment. More specifically, a pet crate restricts the pet's view of its surroundings, limits the pet's ability to stand and stretch, and restricts the circulation of air to the pet. Additionally, a pet owner's access to a pet that is confined within a conventional pet crate is limited to the ingress/egress. Also, a conventional pet crate is not aesthetically pleasing to most pet owners.

Other devices for animal containment include electronic containment fences that bound an area with an antenna. A transmitter connected to the antenna generates a signal that broadcasts at a limited range from the antenna creating an electronic boundary. A correction unit carried by an animal is designed to receive the broadcast signal when the animal approaches the antenna. Depending on the proximity to the boundary, i.e., the signal strength of the received signal, the correction unit issues a warning or correction stimulus that deters the animal from moving closer to the boundary. When the animal is outside the broadcast range of the signal, it is considered to be in the safe zone where no stimulus is received. While such systems are generally satisfactory for larger areas, such as a yard, the signal must have a broadcast range sufficient to reach correction unit at the height of a large dog. Accordingly, the minimum effective broadcast distance prohibits the use of the electronic containment fences in small areas, i.e., crate-sized areas, because there is insufficient distance to create a safe zone.

BRIEF SUMMARY OF THE INVENTION

A portable animal containment device for confining an animal to a defined area is shown and described. The portable animal containment device includes a flat and a correction unit. The flat is adapted to be portable and defines the area within which an animal is confined. The flat has an associated presence detector for detecting whether the animal is occupying the flat. When the presence detector indicates that the animal is not occupying the flat, a signal is transmitted to the correction unit by way of wireless communication. The correction unit is carried by the animal and administers a stimulus to the animal when the correction unit receives the signal from the transmitter. Consequently, when the animal moves beyond the boundary defined by the flat, it receives a stimulus, which encourages the animal to remain in the flat.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A portable animal containment device for confining an animal to a defined area is illustrated generally at 100. The portable animal containment device 100 includes a flat and a correction unit. The flat is adapted to be portable and defines the area within which an animal is confined. The flat has an associated presence detector for detecting whether the animal is occupying the flat. When the presence detector indicates that the animal is not occupying the flat, a signal is transmitted to the correction unit by way of wireless communication. The correction unit is carried by the animal and administers a stimulus to the animal when the correction unit receives the signal from the transmitter. Consequently, when the animal moves beyond the boundary defined by the flat, it receives a stimulus, which encourages the animal to remain in the flat.

Figure 1:
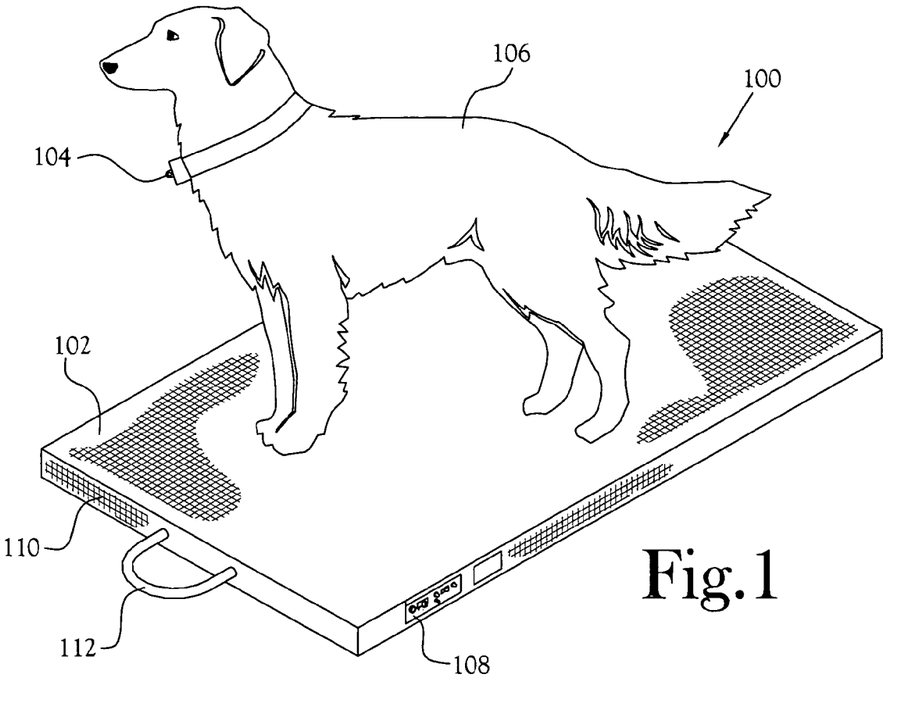
FIG. 1 is a perspective view of the portable animal containment device in accordance with the various features of the present invention.

FIG. 1 illustrates a perspective view of one embodiment of the portable animal containment device 100 in accordance with the various features of the present invention. The portable animal containment device 100 includes a flat 102 that defines the boundary area and a correction unit 104 worn by the animal 106 and in communication with the flat 102. The flat 102 includes a sensor that detects the presence or absence of an animal in the area of the flat. A control unit 108 associated with the flat 102 communicates with the correction unit 104 to provide a correction stimulus to the animal 106 should the animal attempt to exit the flat 102. The control unit 108 includes a user interface that allows the operational characteristics of the portable animal containment device 100 to be adjusted as desired.

Figure 2:
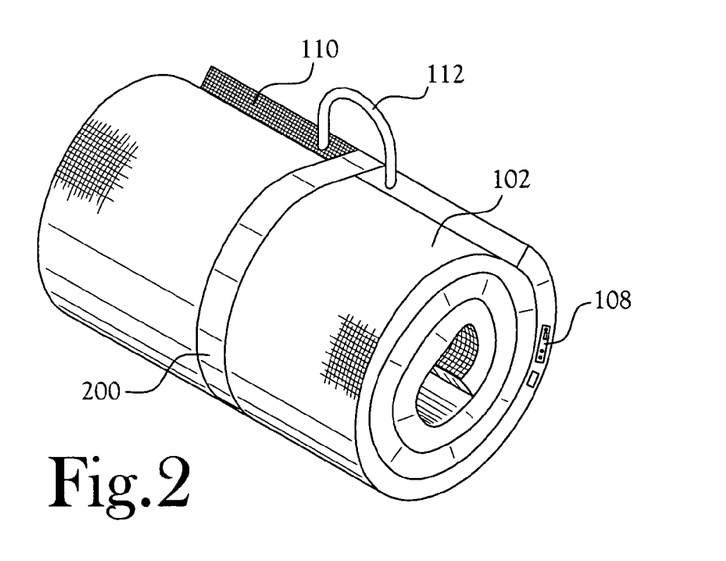
FIG. 2 is a perspective view of the portable animal containment device of FIG. 1 illustrating the portability of the portable animal containment device.

In the illustrated embodiment, the flat 102 is a flexible mat having a first end 110. A handle 112 is secured to the first end 110 of flat 102. The flat 102 is adapted to be rolled-up to the extent that the flat 102 has a compact cylindrical appearance, as illustrated in FIG. 2. A removable strap 200 is disposed around the flat 102 to secure the flat 102 in a rolled-up position. Those skilled in the art will recognize that other mechanisms for securing the flat 102 in its rolled-up position, such as appropriately disposed snap fasteners or hook and loop fasteners, can be used without departing from the scope or spirit of the present invention. The rolled-up flat 102 is easily carried by way of the handle 110, thus, making the flat 102 portable.

Figure 3:
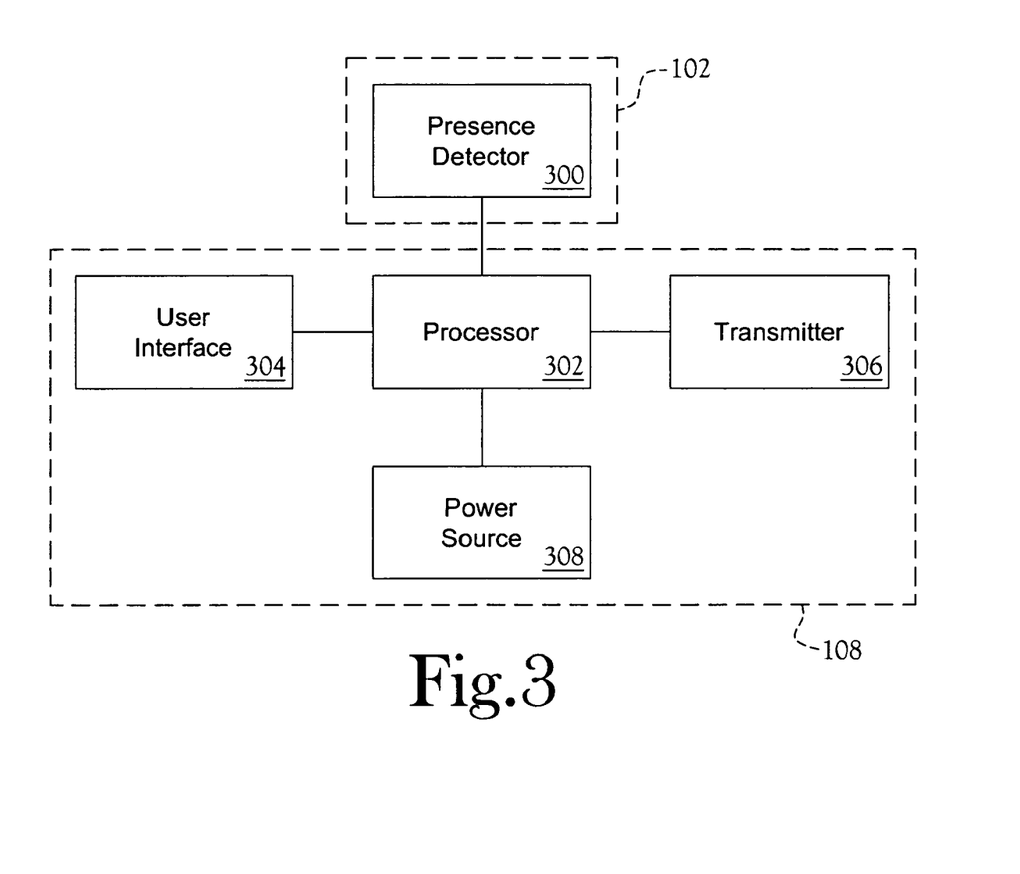
FIG. 3 is a block diagram of the flat (boundary area) of one embodiment of the portable animal containment device of the present invention.

FIG. 3 illustrates a block diagram of one embodiment of the boundary defining portions of the portable animal containment device 100. The portable animal containment device 100 includes a presence detector 300 that is responsive to some characteristic identifying whether the animal 106 is on the flat 102. The output of the presence detector 300 is read by a controller 302 that controls the operation of the portable animal containment device 100. Those skilled in the art will recognize that the controller 302 can be any device suitable for providing the necessary logic including a collection of discrete components, a processor, a programmable interrupt controller, and other similar devices. The operator adjusts various parameters of the portable animal containment device 100 through a user interface 304 in communication with the controller 302. Should the conditions indicate that the animal 106 has left the flat 100, the controller 302, in cooperation with a transmitter 306, produces a signal that activates the correction unit 102 to apply a corrective stimulus to the animal 106. In one embodiment, the transmitter 306 broadcasts a radio frequency signal. The boundary-defining portion of the portable animal containment device operates from a power supply 308. In one embodiment, the power supply accepts line voltage when plugged into an electrical outlet. In another embodiment, power is supplied through a battery, either rechargeable or replaceable, obviating the need for placement near an electrical outlet.

In one embodiment, a mechanical device compressible by the application of weight, i.e., a scale, allows the presence detector 300 to be responsive to the force from the body weight of the animal. One embodiment of the presence detector 300 operates simply as a switch and effectively produces a binary output indicating either no weight or some weight. More discriminating embodiments of the portable animal containment apparatus 100 operate on the principle of a digital scale to detect the presence of the animal allowing for triggering based on variations in weight, such as when the animal 106 partially leaves the flat 102 and transfers a significant amount of weight off of the flat 102. In other embodiments, the presence detector 300 is a sensor that utilizes measurable criteria other than weight for determining the presence or absence of an animal in the flat, such as an optical sensor, a heat sensor, or a sensor that is sensitive to changes in electrical characteristics such as capacitance, resistance, inductance, or impedance. The presence detector 300 is disposed within the flat 102 such that the presence detector 300 monitors the area of a top face 114 of the flat 102.

In the illustrated embodiment, the presence detector 300 is carried by the flat 102. The control box 106 is illustrated as a separate component that is in communication with the presence detector 300. In another embodiment, the control box is integrated into the flat 102.

Figure 4:
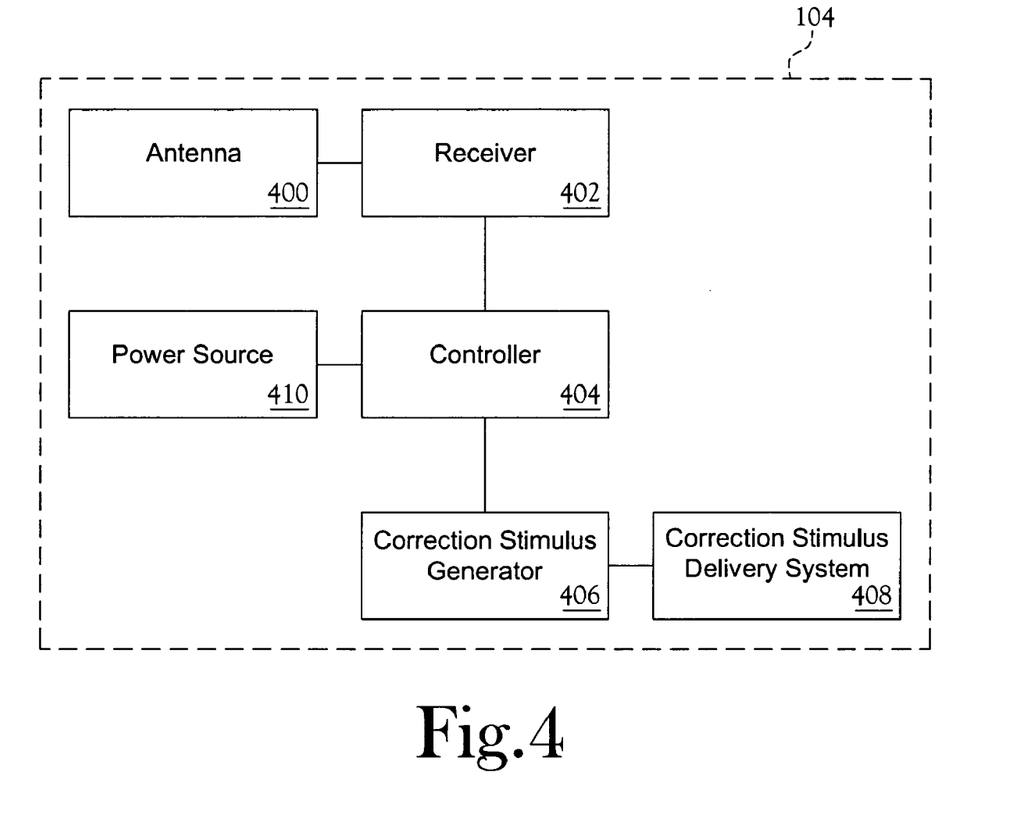
FIG. 4 is a block diagram of the correction unit of one embodiment of the portable animal containment device of the present invention.

FIG. 4 is a block diagram of one embodiment of the correction unit carried by the animal 104. The correction unit includes an antenna 400 of suitable dimensions and loading to receive the broadcast signal. The output of the antenna 400 feeds a receiver 402 tuned to the frequency of the transmitter 306. The signal decoded by the receiver 402 is passed to a controller 404 for further processing. The correction unit controller 404 decodes the received signal to determine whether a stimulus should be applied to the animal 106 and, potentially, additionally determines the type and/or intensity of the stimulus. If a stimulus is warranted, the controller 404 activates the correction stimulus generator 406 which generates a stimulus of appropriate type and intensity. The stimulus is applied to the animal 406 through the correction stimulus delivery system 408. Those skilled in the art will be familiar with appropriate types of stimulus generation and delivery mechanisms. Examples include an olfactory stimulus delivered through spray mechanism, a pet-audible stimulus delivered through a speaker, or an electrical shock stimulus delivered through conductive electrodes. Accordingly, when the animal 106 moves beyond the boundary defined by the flat 102, and during the period of time that the animal 106 is not within the boundary defined by the flat 102, the animal 106 suffers the administration of a stimulus by the correction unit 104. The correction unit 104 is powered by a power source 410, typically a portable power source such as a replaceable or rechargeable battery.

Those skilled in the art will appreciate that the block diagrams of FIGS. 3 and 4 are not intended to show every component or interconnection. For example, power supply lines and regulation, trim, and buffers are omitted, but their use and implementation will be understood by those skilled in the art.

Figure 5:
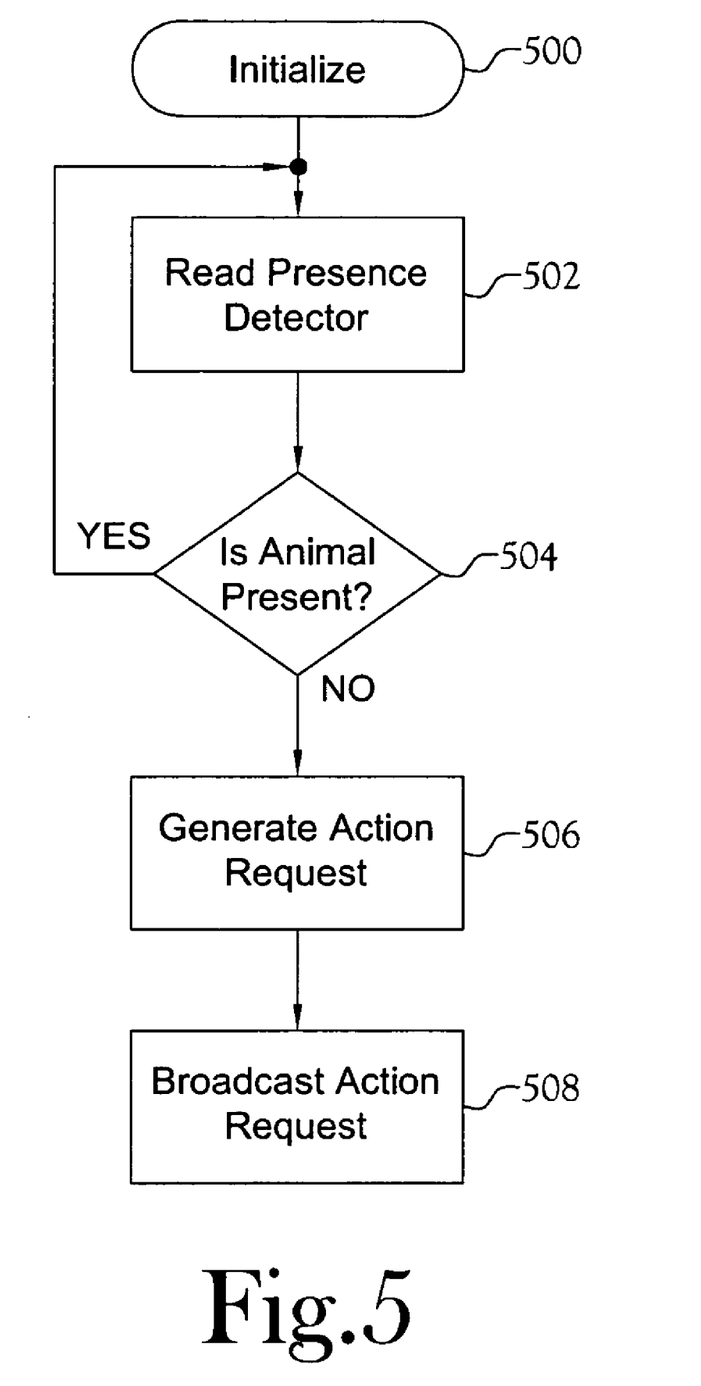
FIG. 5 is a flow chart of the method performed by the electronics associated with the flat.

FIG. 5 is a flow diagram of a basic control program for operating the portable animal containment device 100. To start, the portable animal containment device 100 is initialized 500. The initialization procedure sets basic parameters such as the threshold for determining when the animal 106 occupies the flat 102. Next, the controller 302 receives an input from the presence detector 300. In one embodiment, the presence detector 300 is a passive device polled by the controller 302 on a periodic basis. The answer returned by the presence detector 300 is processed by the controller 302 to determine whether the animal occupies the flat 102. In another embodiment, the presence detector 300 is an active device that provides a continuous output read by the controller 302. Changes of state in the output of the presence detector 300 trigger a response from the controller 302. If the controller 302 determines that the animal 106 is present 504, processing continues normally. When the controller 302 determines that the animal 106 no longer occupies the flat 102, an action request is generated 506. In the determination of whether an animal occupies the flat 102, the controller 302 compares the output of the presence detector 300 to a detection condition. The detection condition varies with the type of presence detector 300 employed. For example, a presence detector 300 sensitive to variations in weight or temperature produces an analog or digital output corresponding to the measured weight or temperature. The controller 302 employs a logical test or algorithm that compares the output of the presence detector 300 to a detection parameter or threshold value to determine whether the animal occupies the flat 102. In some embodiments, the parameter or threshold value is adjustable by an operator to account for varying conditions.

The generation of the action request varies depending upon the sophistication of the portable animal containment device 100. In one embodiment, the action request is merely a modulated signal that indicates that the animal 106 should receive a correction. In another embodiment where the correction unit 104 has the capability of a variable intensity correction stimulus and control of the intensity is handled at the control box 108, the action request is coded to include intensity information. In this instance, the controller 302 reads the setting for the intensity and incorporates that reading into the coded action request. Further coding of the action request in other embodiments includes the mode of operation and/or the association of an identifier associated with a particular correction unit 104. Once the action request is properly generated 506, the action request is provided to the transmitter 306 and broadcast 508 to the correction unit 104.

Design choices for the presence detection process dictate the principles of operation. Take, for example, a presence detector 300 sensing the weight applied to the flat 102. In one embodiment, applying at least the threshold weight to the flat 102 causes the presence detector 300 to generate a presence signal. While the presence signal is seen by the controller 302, the animal 106 is presumed to be occupying the flat 102. In another embodiment, reducing the weight below threshold level results in the generation of an absence signal. Unless an absence signal is seen by the controller 302, the animal 106 is presumed to be occupying the flat 102. Still further embodiments, generate multiple signals such as both a presence signal and an absence signal. By generating more than one signal, the fault tolerance of the portable animal containment device 100 is increased.

Figure 6:
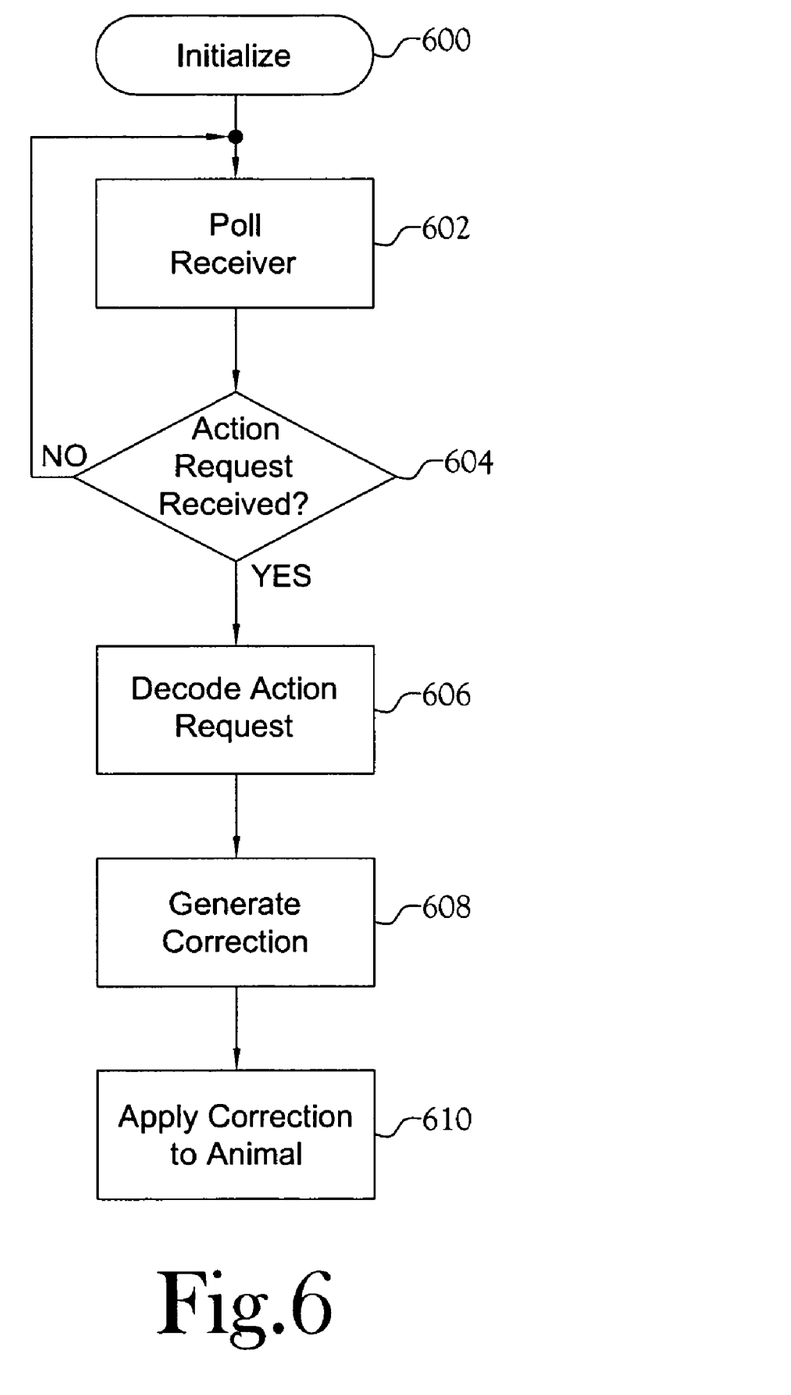
FIG. 6 is a flow chart of the method performed by the electronics associated with the correction unit.

FIG. 6 is a flow diagram of a basic control program for operating the correction unit 104 associated portable animal containment device 100. The correction unit receives 602 information from the receiver, for example by polling. Signals present at the receiver are analyzed 604 to determine if an action request has been received. If an action request is received, the action request is decoded 606. As previously discussed, in one embodiment, the action request includes information about the type and intensity of corrective stimuli to be applied to the animal 106. With the parameters, the correction unit generates 608 an appropriate correction stimulus. The correction stimulus is applied to the animal 106 to discourage the animal from leaving the area of the flat 102.

Figure 7:
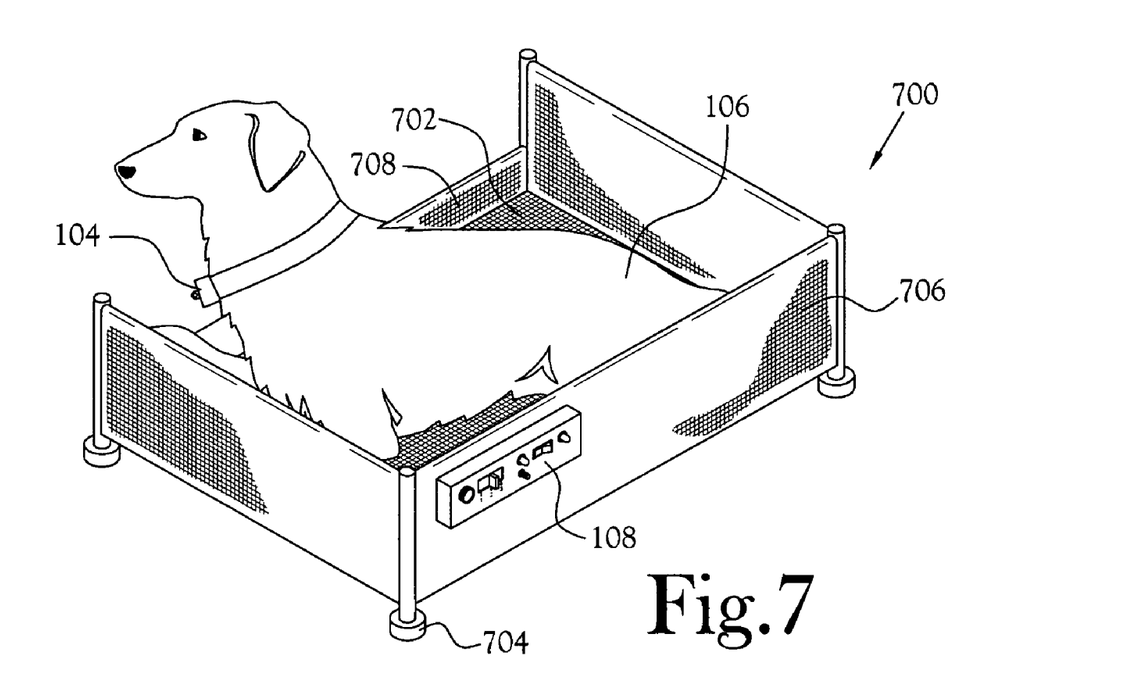
FIG. 7 is an alternate embodiment of the portable animal containment device where the flat of the portable animal containment device is a raised shallow-frame pet bed.

FIG. 7 is a perspective view of an alternate embodiment of a portable pet containment apparatus 700. As with the previous embodiment, the portable pet containment apparatus 700 has a flat 702 that is responsive to the presence or absence of the animal 106 by virtue of an associated sensor. A plurality of side/rear walls 704 and a front wall 706 that visually and physically provide an indication of the boundary defined by the portable pet containment apparatus 700. The walls 704, 706 are supported by a plurality of wall supports 708. In the illustrated embodiment, the wall supports 708 are pillars located at each corner of the flat 702. In various embodiments, the walls are permanently connected to the flat 702 and wall supports are removable or hingeably connected to the flat 702. When raised to an upright position or inserted, the wall supports support the walls while in use. When removed or folded to a prone position, the walls collapse for compact storage and travel. In another embodiment, the walls and wall supports form a removable skirt that is optionally used with the portable animal containment apparatus 700. Those skilled in the art will appreciate other wall supports and engagement structures or methods suitable for use depending on the design and objectives of the walls.

In the illustrated embodiment, the front wall 706 has a lower height than the side walls 704, which visually suggests a portal. Those skilled in the art will recognize that the height, shape, or number of walls 704, 706 can vary without departing from the scope and spirit of the present invention. The walls 704, 706 are not intended to form a barrier, as with a crate. Instead, the walls 704, 706 are primarily for aesthetic purposes, safety purposes, or for training purposes. Generally, the portable animal containment apparatus 700 takes on the appearance of a pet bed and not a cage making it substantially more visually appealing than prior art devices. In various embodiments, the aesthetic use of the walls 704, 706 allows differing decorative patterns, shapes, or numbers of walls to be employed. The addition of the walls 704, 706 also provides a larger visual target, which is useful to make people aware of the portable animal containment apparatus 700 and prevent accidents, such as tripping. Finally, the walls 704, 706 serve as a training aid to help the pet visual learn and accept the boundary defined by the portable animal containment apparatus 700. By virtue of the embodiments shown, those skilled in the art will recognize that the shape of the flat can vary and that the flat can be a structure other than a flexible mat without departing from the scope or spirit of the present invention.

Figure 8:
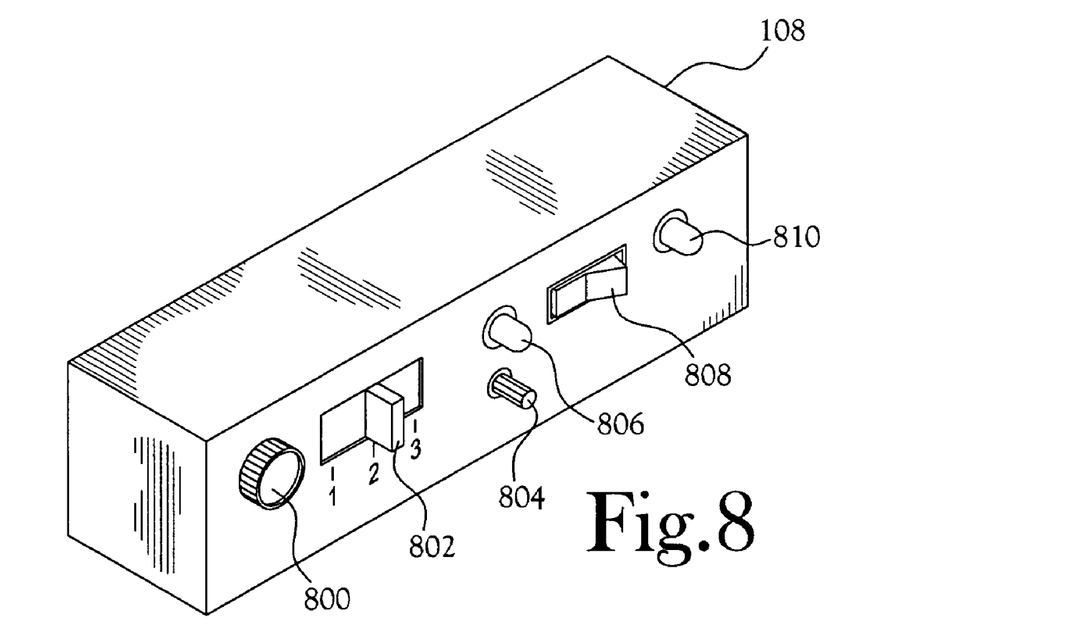
FIG. 8 is a perspective view of one embodiment of a control box for use with the portable animal containment device.

FIG. 8 illustrates the user interface 304 of the control box 108. The user interface 304 includes a stimulus intensity adjustor 800, mode selector 802, threshold adjustor 804, pet-in-flat indicator 806, on/off switch 808, and an on/off indicator 810. The stimulus intensity adjustor 800 allows adjustment of the stimulus level applied to the animal 106. The mode selector 802 allows selection of the mode of operation for the portable animal containment device 800. The threshold adjustor 804 adjusts the sensitivity of the presence detector 300. The pet-in-flat indicator 806 indicates whether the presence detector 300 senses the presence of the animal 106 on the flat 102. The on/off switch 808 dictates whether the portable animal containment device 100 receives power from the power source 308 (on) or does not receive power from the power source 308 (off). Finally, the on/off indicator 810 provides a visual indication of whether the portable animal containment device 100 is powered for active containment of the animal 106.

In one embodiment, the mode selector 802 provides three available modes of operation. By way of example, one arrangement for the three modes of operation is for a first mode to administer an warning stimulus, such as an audio stimulus for a first length of time, when the animal 106 moves beyond the boundary defined by the flat 102 followed by correction stimulus, such as an electrical shock stimulus, until the pet returns inside the boundary defined by the flat 102. A second mode administers a warning stimulus for a longer time period followed by a correction stimulus. A third mode offers only a warning stimulus while the animal 106 is outside of the boundary defined by the flat 102 without ever applying a correction stimulus.

In the embodiment of the portable animal containment device detecting presence of the basis of the animal's weight, the threshold adjustor 804 allows adjustment of the weight required to indicate presence. Adjusting the weight to correspond to the animal being contained allows the presence detector 300 to distinguish between the animal occupying the flat 102 and, for example, an animal toy occupying the flat 102. To adjust the threshold of the presence detector 300, the animal 106 is placed on the flat 102 while the portable animal containment device 100 is off. The portable animal containment device is then turned on and the threshold adjustor 804 is adjusted until the pet-in-flat indicator 806 starts blinking. The threshold adjuster 804 is backed off until the pet-in-flat indicator 806 stops blinking, completing the adjustment of the threshold weight necessary to determine whether the animal 106 is occupying the flat. Those skilled in the art will recognize other methods for adjusting the threshold of the presence detector 300 without departing from the scope or spirit of the present invention.

When not in adjustment mode, the pet-in-flat indicator 806 indicates whether the animal 106 is within the boundary defined by the flat 102. As previously discussed, the controller 302 communicates with the presence detector 300. When the controller 302 determines that the animal 106 is within the boundary defined by the flat 102, the pet-in-flat indicator 806 is illuminated. Conversely, if the animal 106 is determined not to occupy the flat 102, the pet-in-flat indicator 806 is not illuminated.

In the illustrated embodiment, the stimulus intensity adjustor 800 and the threshold adjustor 804 are rotary switches, the mode selector is a multi-position slide switch, the on/off switch 808 is a toggle switch, and the pet-in-flat indicator 806 and the power indicator 810 are light-emitting diodes. Those skilled in the art will appreciate the component substitutions that are available depending upon the design of the circuit. Further, those skilled in the art will recognize that the user interface 304 can include more, less, or different controls and features than those discussed in conjunction with the illustrated embodiment without departing from the scope or spirit of the present invention.

The portable animal containment device 100 additionally operates as an animal training aid. More specifically, the portable animal containment device 100 aids in training an animal 106 to respond to a command such as "stay" by limiting the animal 106 from moving from the location of the portable animal containment device 100. For example, the trainer places the animal 106 in the flat 102 and gives the command "stay." If the animal 106 attempts to move from the designated location, i.e., moves beyond the boundary defined by the flat 102, the animal 106 receives a stimulus. By correcting the animal 106 with a stimulus when the animal 106 does not "stay," the portable animal containment device 100 encourages the animal 106 to respond to the command by "staying" in the designated location.

From the foregoing description, those skilled in the art will recognize that a device for confining an animal to a defined area offering advantages over the prior art has been provided. The device provides animal containment without the unaesthetic and unpleasant characteristics of tangible barriers. Further, the device provides animal containment that is portable.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A portable animal containment device comprising:
   a flat defining a containment area having a perimeter;
   a presence detector cooperating with said flat, said presence detector detecting a characteristic indicative of whether the animal occupies said flat, said presence detector producing an output corresponding to said characteristic;
   a controller in communication with said presence detector, said controller determining whether the animal occupies said flat by comparing said output to a detection condition indicative of whether an animal occupies said flat, said controller generating an action request when comparing said output to the detection condition indicates that the animal occupied said flat but currently does not occupy said flat;
   a transmitter in communication with said controller, said transmitter transmitting a broadcast signal containing said action request when said controller generates said action request; and
   a correction unit carried by the animal, said correction unit receiving said broadcast signal, said correction unit responsive to said action request and producing a stimulus, said correction unit delivering said stimulus to the animal.

2. The portable animal containment device of claim 1 wherein said presence detector is disposed within said flat.

3. The portable animal containment device of claim 1 further comprising at least one wall disposed around said perimeter of said containment area, said at least one wall providing a visual marker of said perimeter, said at least one wall being traversable by the animal at will.

4. The portable animal containment device of claim 1 wherein said characteristic is an applied force corresponding to a weight applied to said flat.

5. The portable animal containment device of claim 1 wherein said characteristic is an electrical characteristic varying based on an interaction between said flat and the animal, said electrical characteristic selected from the group consisting of resistance, capacitance, inductance, and impedance.

6. The portable animal containment device of claim 1 further comprising a threshold adjustor in communication with said controller, said threshold adjustor adjusting a parameter associated with said detection condition.

7. A portable animal containment device comprising:
   a flat, said flat defining the area of containment, said flat defining a top face;
   a presence detector, said presence detector being a weight sensor, said presence detector disposed within said flat such that said presence detector is responsive to forces applied to said top face of said flat;
a transmitter, said transmitter in electrical communication with said presence detector, said transmitter transmitting a radio frequency signal in response to an output of said presence detector; and
a correction unit, said correction unit adapted for wireless communication with said transmitter, said correction unit carried by an animal, said correction unit adapted to administer a stimulus to the animal in response to receipt of said radio frequency signal.

8. The portable animal containment device of claim 7 further comprising at least one wall disposed around said perimeter of said containment area, said at least one wall providing a visual marker of said perimeter, said at least one wall being traversable by the animal at will.

9. A portable animal containment device comprising:
a flat defining a containment area and having a top surface;
a presence detector integral with said flat, said presence detector generating an output corresponding to a weight applied at the top surface of said flat;
a controller in communication with said presence detector, said controller determining whether an animal occupies said flat by comparing said output to a detection condition indicative of whether an animal occupies said flat, said controller generating an action request when comparing said output to the detection condition indicates that the weight applied at the top surface of said flat satisfies at least one weight threshold;
a transmitter in communication with said controller, said transmitter transmitting a signal containing said action request when said controller generates said action request; and
a correction unit carried by the animal, said correction unit receiving said broadcast signal, said correction unit responsive to said action request and producing a stimulus, said correction unit delivering said stimulus to the animal.

10. The portable animal containment device of claim 9 wherein the at least one weight threshold includes 0% of the animal's body weight.

11. The portable animal containment device of claim 9 wherein the at least one weight threshold includes 100% of the animal's body weight.

12. The portable animal containment device of claim 9 wherein the at least one weight threshold includes 50% of the animal's body weight.

13. The portable animal containment device of claim 9 wherein said presence detector is a scale.

14. The portable animal containment device of claim 9 wherein the output of said presence detector is contingent on the variance of an electrical characteristic contingent on an interaction between said flat and the animal.

15. The portable animal containment device of claim 14 wherein the electrical characteristic is selected from the group consisting of resistance, capacitance, inductance, and impedance.

16. The portable animal containment device of claim 14 wherein the interaction between said flat and the animal includes the percentage of the animal's body weight exerted on the top surface of said flat.

17. A portable animal containment device comprising:
a flat defining a containment area having a perimeter;
a presence detector in communication with said flat, said presence detector detecting a characteristic indicative of whether the animal occupies said flat, said presence detector producing an output corresponding to said characteristic;
a controller in communication with said presence detector, said controller determining whether the animal occupies said flat by comparing said output to a detection condition indicative of whether an animal occupies said flat, said controller generating an action request when comparing said output to the detection condition indicates that the animal occupied said flat but currently only partially occupies said flat or does not occupy said flat;
a transmitter in communication with said controller, said transmitter transmitting a broadcast signal containing said action request when said controller generates said action request; and
a correction unit carried by the animal, said correction unit receiving said broadcast signal, said correction unit responsive to said action request and producing a stimulus, said correction unit delivering said stimulus to the animal.

18. The portable animal containment device of claim 17 wherein the animal partially occupies said flat when a portion of the animal's weight is disposed at said flat and a portion of the animal's weight is not disposed at said flat.

* * * * *